(12) United States Patent
Sako et al.

(10) Patent No.: US 7,346,582 B2
(45) Date of Patent: Mar. 18, 2008

(54) ELECTRONIC MONEY, ELECTRONIC USE RIGHT, CHARGING SYSTEM, INFORMATION PROCESSING APPARATUS, AND REPRODUCING METHOD AND REPRODUCTION CONTROL METHOD OF CONTENTS DATA

(75) Inventors: Yoichiro Sako, Tokyo (JP); Mario Tokoro, Tokyo (JP); Tatsuya Inokuchi, Kangawa (JP); Kaoru Kijima, Tokyo (JP)

(73) Assignee: Sony Corporation (JP)

( * ) Notice: Subject to any disclaimer, the term of this patent is extended or adjusted under 35 U.S.C. 154(b) by 1442 days.

(21) Appl. No.: 09/913,946

(22) PCT Filed: Dec. 20, 2000

(86) PCT No.: PCT/JP00/09023

§ 371 (c)(1),
(2), (4) Date: Aug. 20, 2001

(87) PCT Pub. No.: WO01/46880

PCT Pub. Date: Jun. 28, 2001

(65) Prior Publication Data

US 2002/0128937 A1 Sep. 12, 2002

(30) Foreign Application Priority Data

Dec. 21, 1999 (JP) .................................. 11-363465

(51) Int. Cl.
*H04L 9/28* (2006.01)

(52) U.S. Cl. ........................... 705/51; 713/160; 726/26

(58) Field of Classification Search ............ 705/50–59, 705/64–68; 713/160–168; 380/201–203; 707/9–10; 726/1–10, 26–33
See application file for complete search history.

(56) References Cited

U.S. PATENT DOCUMENTS 5,638,443 A * 6/1997 Stefik et al. .................. 705/54

(Continued)

FOREIGN PATENT DOCUMENTS

JP 10-049584 A 2/1998

(Continued)

OTHER PUBLICATIONS

De Laat, "Systemic Innovation and the Virtues of Going Virtual: The Case of the Digital Video Disc", Jun. 1999, Technology Analysis & Strategic Management, v11n2, pp. 159-180, ISSN: 0953-7325.*

(Continued)

*Primary Examiner*—Mary D. Cheung
(74) *Attorney, Agent, or Firm*—Lerner, David, Littenberg, Krumholz & Mentlik, LLP

(57) ABSTRACT

A system for providing the right to use and reproduce contents data involving so-called electronic money, whereby when compressed and/or encrypted contents data is reproduced, a security for electronic money or an electronic use right is checked, if the electronic money or the electronic use right is invalid as a result of the security check, the reproduction of the contents data is stopped, and if the electronic money or the electronic use right is valid as a result of the security check, the contents data is reproduced and the electronic money or the electronic use right is consumed.

13 Claims, 11 Drawing Sheets

U.S. PATENT DOCUMENTS

| | | | | |
|---|---|---|---|---|
| 5,946,298 A | * | 8/1999 | Okuyama | 370/232 |
| 6,185,683 B1 | * | 2/2001 | Ginter et al. | 713/176 |
| 6,240,185 B1 | * | 5/2001 | Van Wie et al. | 380/232 |
| 6,311,214 B1 | * | 10/2001 | Rhoads | 709/217 |
| 6,385,596 B1 | * | 5/2002 | Wiser et al. | 705/51 |
| 6,512,749 B1 | * | 1/2003 | Wright et al. | 370/316 |
| 6,553,179 B1 | * | 4/2003 | Miwa et al. | 386/94 |
| 6,631,359 B1 | * | 10/2003 | Braitberg et al. | 705/50 |
| 6,950,941 B1 | * | 9/2005 | Lee et al. | 713/193 |
| 7,123,621 B1 | * | 10/2006 | Niida et al. | 370/402 |

FOREIGN PATENT DOCUMENTS

| | | |
|---|---|---|
| JP | 10-154193 A | 6/1998 |
| JP | 10-283320 A | 10/1998 |
| JP | 11-296602 A | 10/1999 |

OTHER PUBLICATIONS

"Denshi Shotorihiki Dai 4 kai Denshi Kessai no Houhou to Kinou", bit. vol. 31, No. 6, Kyouritsu Shuppan K.K., pp. 99-105 (Jan. 6, 1999).

* cited by examiner

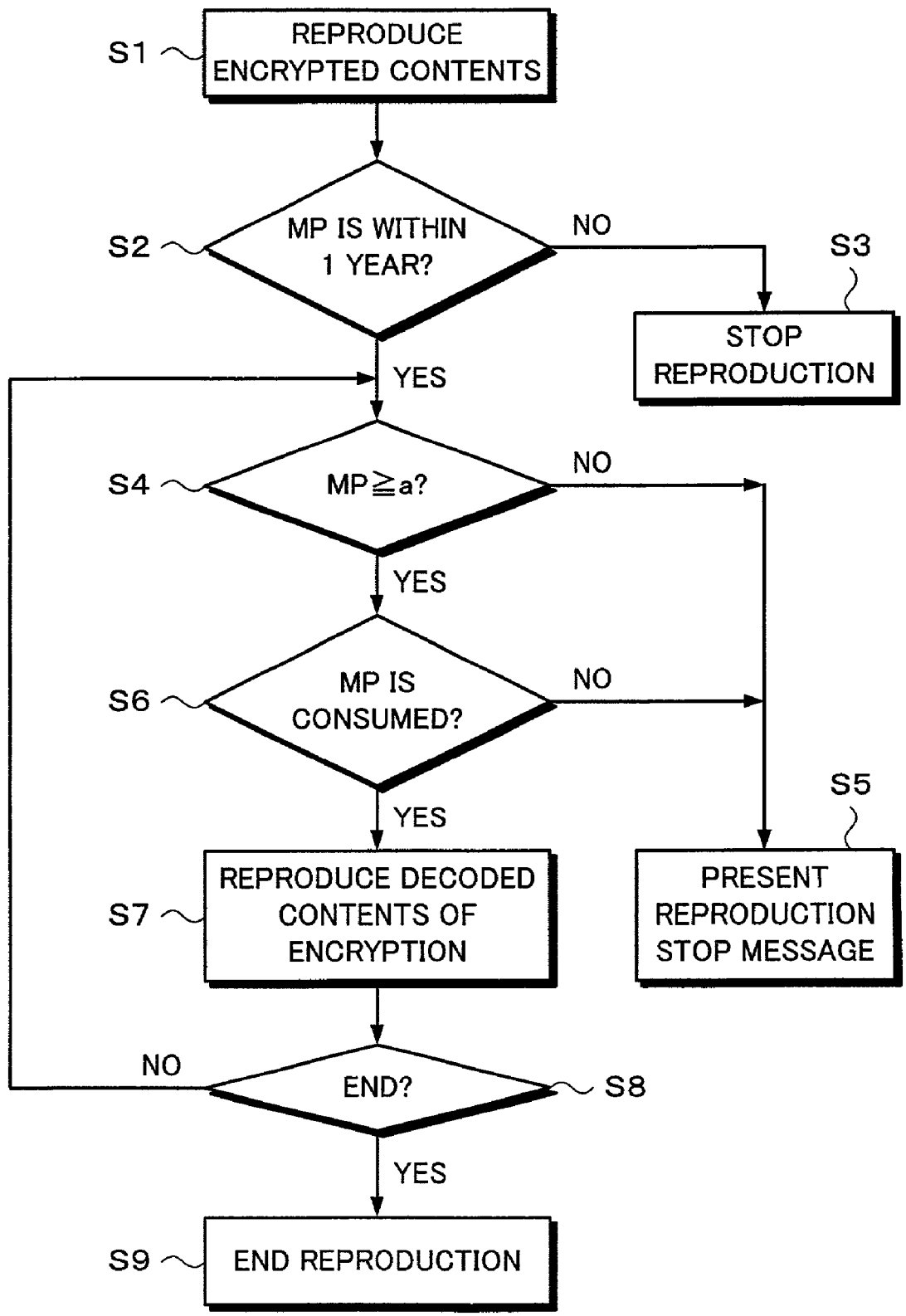

ELECTRONIC MONEY, ELECTRONIC USE RIGHT, CHARGING SYSTEM, INFORMATION PROCESSING APPARATUS, AND REPRODUCING METHOD AND REPRODUCTION CONTROL METHOD OF CONTENTS DATA

TECHNICAL FIELD

The invention relates to electronic money, an electronic use right, a charging system, an information processing apparatus, and reproducing method and reproduction control method of contents data. More particularly, the invention relates to electronic money and electronic use right with a security, a charging system using one of them, an information processing apparatus, and reproducing method and reproduction control method of contents data.

BACKGROUND ART

Electronic money which is circulated in a manner similar to cash is being put into practical use. The electronic money is accumulated in an IC card. As electronic money, there are a prepaid type and an on-credit type. Further, a method whereby the user inputs money into an IC card from his own account of a financial institution or inputs an unused money amount into his account by using the Internet and a personal computer has also been proposed. A method whereby an electronic use right such as charge for a telephone call, a boarding ticket, or the like is realized by an IC card, particularly, a contactless IC card has also been tried.

According to the electronic money and the electronic use right, since information is accumulated into the IC card, there is an advantage such that falsification is more difficult as compared with that of an existing card of the magnetic stripe type. As countermeasures for security, a method whereby data which is transmitted and received between a reader/writer and the IC card is encrypted is considered.

However, even if the data which is transmitted and received between the reader/writer and the IC card has been encrypted, the security for the electronic money and electronic use right is not always sufficient. A method whereby the electronic money and electronic use right are used as a consideration for the use of digital contents such as distributed music or the like is considered. The security for the electronic money and electronic use right with respect to the digital contents themselves is not higher as compared with that in the case where a process such as powerful encryption, copy protection, or the like has been performed. A fact that there are not cooperative works of the use of the digital contents and the electronic money and electronic use right also becomes a cause of a weak security. Unlike the electronic money and electronic use right, when the digital contents is once circulated, its unitary management is difficult and, if the encryption performed to the contents is decrypted, a necessity of executing another encrypting process again or the like is caused. Therefore, it is much troublesome to change a system.

In consideration of the drawbacks as mentioned above, therefore, it is an object of the invention to provide an electronic money, an electronic use right, a charging system, an information processing apparatus, and reproducing method and reproduction control method of contents data, in which a security can be further improved.

DISCLOSURE OF INVENTION

To solve the above problem, according to the invention of claim 1, there is provided electronic money having validity corresponding to cash, wherein
its security can be changed by an issuing source or an administrator.

According to the invention of claim 6, there is provided an electronic use right which enables software such as reproduction or the like of contents to be used, wherein
a security of the electronic use right can be changed by an issuing source or an administrator.

According to the invention of claim 12, there is provided a charging system in which when software which was compression encoded and/or encrypted is distributed and the user decodes the distributed software, a charging process is performed through electronic money which the user possesses, wherein
a security for the electronic money can be changed by an issuing source or an administrator.

According to the invention, there is provided a charging system in which when software which was compression encoded and/or encrypted is distributed and the user decodes the distributed software, a charging process is performed through an electronic use right which the user possesses, wherein
a security for the electronic use right can be changed by an issuing source or an administrator.

According to the invention, there is provided a system which operates by using electronic money or an electronic use right, wherein
a security for the electronic money or electronic use right is checked, and
when a result of the security check indicates NG, at least either a stop of the operation of the system or a notification showing that the result of the security check indicates NG is performed.

According to the invention, there is provided a charging system in which when software which was compression encoded and/or encrypted is distributed and the user decodes the distributed software, a charging process is performed through electronic money or an electronic use right which the user possesses, wherein
a security for the electronic money or electronic use right is checked, and
when a result of the security check indicates NG, at least either a stop of the operation of the system or a notification showing that the result of the security check indicates NG is performed.

According to the invention, there is provided an information processing apparatus in which when distributed software which was compression encoded and/or encrypted is decoded, a charging process is performed through electronic money or an electronic use right, wherein
a security for the electronic money or electronic use right is checked, and
when a result of the security check indicates NG, at least either a stop of the decoding of the software or a notification showing that the result of the security check indicates NG is performed.

According to the invention, there is provided a reproducing method of contents data, comprising the steps of:
checking a security for an electronic use right when compressed and/or encrypted contents data is reproduced;
stopping the reproduction of the contents data when the electronic use right is invalid as a result of the security check; and performing the reproducing process of the contents data and consuming the electronic use right when the electronic use right is valid as a result of the security check.

According to the invention, there is provided a reproducing method of contents data, comprising the steps of:

checking a security for an electronic use right which is used in a charging process that is executed when compressed and/or encrypted contents data is reproduced;

stopping the reproduction of the contents data when the electronic use right is invalid as a result of the security check; and performing the reproducing process of the contents data and executing the charging process on the basis of the electronic use right when the electronic use right is valid as a result of the security check.

According to the invention, there is provided a reproduction control method comprising the steps of:

storing an electronic use right purchased from a management organization into a memory in a player;

checking a security for the electronic use right which is used in a charging process which is executed when compressed and/or encrypted contents data is reproduced by the player;

stopping the reproduction of the contents data when the electronic use right is invalid as a result of the security check; and performing the reproducing process of the contents data and executing the charging process on the basis of the electronic use right when the electronic use right is valid as a result of the security check.

BRIEF DESCRIPTION OF DRAWINGS

FIG. 11 is a flowchart for explaining associated processes of a security check of the listening right data and a reproduction of contents in the embodiment of the invention.

BEST MODE FOR CARRYING OUT THE INVENTION

Figure 1:
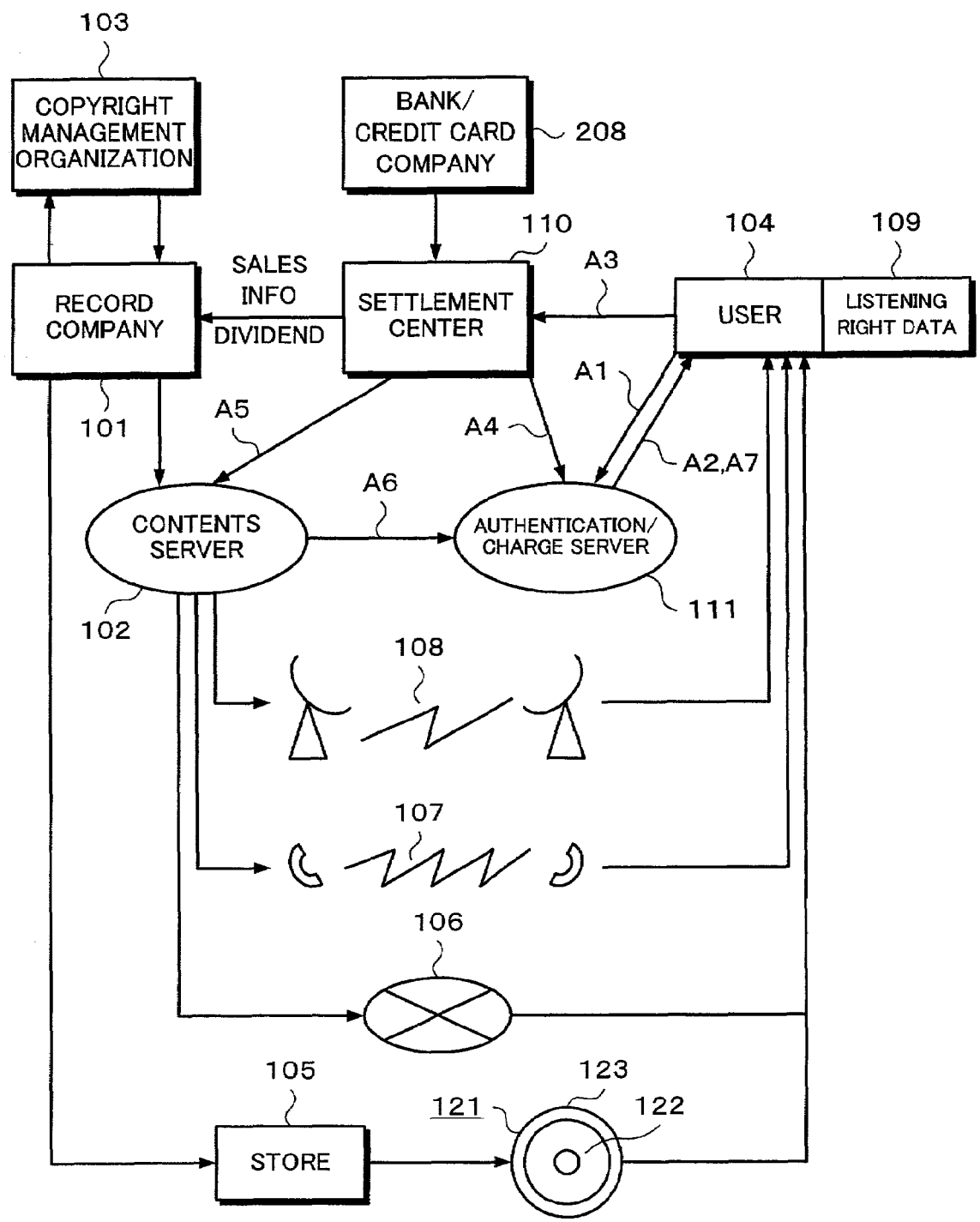
FIG. 1 is a block diagram showing an outline of a whole system according to an embodiment of the invention.

An embodiment in which the invention is applied to a music distribution system EMD (Electric Music Distribution) will now be described hereinbelow. An outline of the music distribution system will be first described with reference to FIG. 1. In FIG. 1, reference numeral 101 denotes a music contents provider, for example, a record company, and 102 indicates a contents server. The record company 101 produces music contents and distributes them. The record company 101 also performs a compression encoding, an encryption, and an embedding of a watermark with respect to the music contents. Contents data as well as the music contents produced by the record company 101 is accumulated into the contents server 102.

Reference numeral 103 denotes a copyright management organization. For example, JASRAC (Japanese Society for the Rights of Authors, Composers, and Publishers) is a specific example of the copyright management organization 102. The record company 101 registers a right regarding a copyright of the music contents into the copyright management organization 103 and receives a copyright fee from the copyright management organization 103.

Reference numeral 104 denotes a user device having a reproducing function of the distributed music contents. The user device 104 has functions for reproducing contents data as distributed music contents and performing a process for charging for the reproduction. That is, the contents data can be reproduced by decoding an encryption performed to the contents data as distributed music contents and decoding a compression encoding. For the decoding of the contents data, that is, by the reproduction of the music contents, a charging is made. A contents delivery provider exists between the contents server 102 and user device 104 as necessary and distributes the contents data in the contents server 102 to the user. As distributing means which is used by the distribution provider, there are several means. One of them is a store 105. For example, a media in which contents has been recorded, for example, a medium such as CD-ROM, a CD, or the like is distributed as a supplement of a magazine. A wire network 106 like Internet or CATV (cable television) is used as distributing means of the contents. Further, a cellular phone network 107 and a satellite network 108 such as satellite broadcast, satellite communication, or the like can be also used as distributing means of the contents.

In the invention, it is not obstructed to use distributing means of contents which is distributed with charge as contents distributing means mentioned above. In case of the medium, for example, CD (Compact Disc: CD, registered trademark), a copyright fee for recorded music pieces is included in the price of the CD. It is also possible to distribute free of charge and record contents data which is charged for decoding (reproduction) into another recording area different from a recording area in which toll contents data has been recorded.

In FIG. 1, an extended CD 121 as one of the media which are delivered by the store 105 is shown. A recording area 122 on the inner rim side of the extended CD 121 is an area which has the same format as that of the existing CD and in which music piece data as contents data whose distribution is charged for and whose reproduction is free has been recorded. A recording area 123 on the outer rim side provided on the outer rim side of the recording area 122 on the inner rim side is an area in which contents data whose distribution is free and whose reproduction is charged for has been recorded. Since the contents data which is recorded in the recording area 123 has been subjected to a compression encoding process, at least the music data of a necessary length, for example, the contents data having almost the same length as that of the contents data recorded in the recording area 122 on the inner rim side in a state where a decompressing process has been executed can be recorded in the area 123.

Also in case of a media such as MD (Mini Disc: registered trademark), memory card, and the like other than the CD, the contents data whose distribution is charged for and whose reproduction is free and the contents data whose distribution is free and whose reproduction is charged for can be recorded as areas which can be distinguished from each other. The contents data whose distribution is free and whose reproduction is charged for can be also distributed by using a service for distributing music contents by using the satellite television broadcast.

The user device 104 can receive the distributed or delivered contents data free of charge. The user can also freely deliver the received contents data to another person again through the communication line network. "Free" used here denotes that the fees do not include the actual expenses such as communication fee, charge for electricity, and the like but is free with respect to a copyright fee. When the contents data received by the user device 104 is reproduced, more specifically speaking, when the encryption performed to the contents data is decoded, a charging process including the copyright fee is executed. Listening right data 109 is used for the charging process. The listening right data 109 has been stored in an IC card or a memory in a secure decoder. The listening right data 109 can be rewritten by a charger which the user possesses or by a sales terminal installed in the nearest store under the management of a listening right data management company. The listening right data 109 is, for example, a degree at which the contents data as contents such as music contents or the like can be reproduced. Each time the user device 104 reproduces the contents as a target to be charged for, the degree as listening right data 109 is subtracted.

Although the listening right data 109 as an electronic use right will be explained as an example hereinbelow, electronic money having a configuration of listening right data as it is, which will be explained hereinlater, as it is can be also used for payment for the reproduction of the contents data. Further, a multipurpose IC card which can handle electronic money, listening right data, and the like in a lump can be also used.

A settlement center 110 exists for the purpose of making a cost settlement in association with the record company 101, copyright management organization 103, and user device 104. The settlement center 110 has an authentication/charge server 111. The settlement center 110 makes a cost settlement with a bank/credit card company 208.

When the user device 104 requests a reproduction of the distributed or delivered contents data, the authentication/charge server 111 is requested to authenticate the user device 104 (shown by a path of Al). When the user device 104 is determined to be legal on the basis of a user ID or the like and the authentication is satisfied, the authentication/charge server 111 requests the user device 104 to charge for reproduction of the contents data (path A2). The user device 104 makes a cost settlement with the settlement center 110 (path A3).

The settlement center 110 notifies the authentication/charge server 111 of a fact that the charge has been performed or the charging process can be performed as shown by a path A4, and requests the contents server 102 to transmit the contents data (path A5). The contents server 102 supplies key data for decoding the encryption performed to the contents data to the authentication/charge server 111 (path A6). The authentication/charge server 111 sends the key data received from the contents server 102 to the user device 104 (path A7). On the basis of the key data transmitted from the server 111, the user device 104 decodes the encryption performed to the contents data and can reproduce the contents data. When the contents data is decoded, it is decided that the contents has been reproduced. The degree of the listening right data 109 is decreased by, for example, "1". When the degree of the listening right data 109 reaches "0", the user device 109 cannot decode the contents data.

Figure 2:
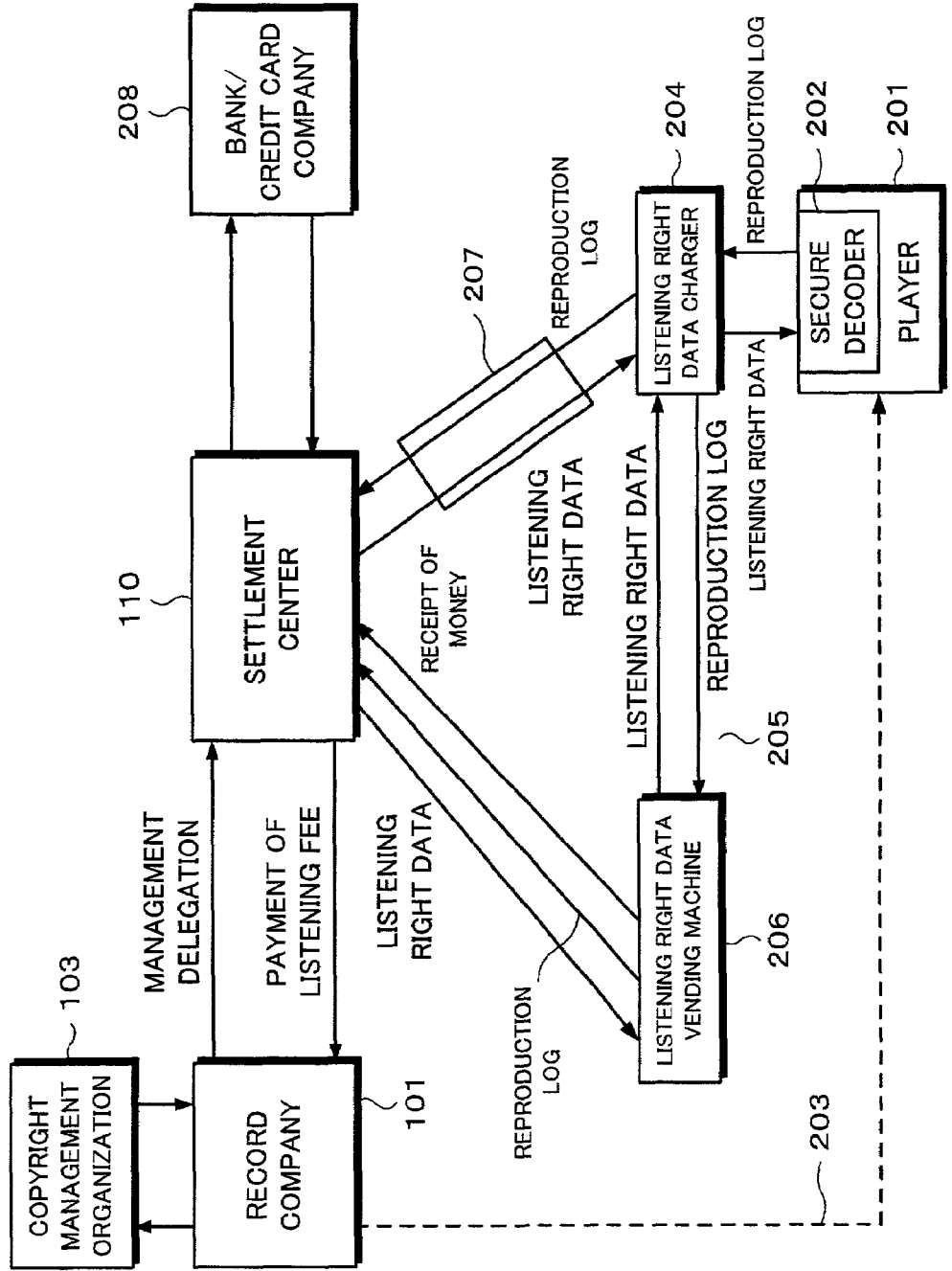
FIG. 2 is a block diagram for explanation regarding listening right data in the embodiment of the invention.

FIG. 2 shows an example of a system regarding the listening right data 109, and the delivery of the music contents and the transmission and reception of the data for decoding the encryption of the contents data as music contents are omitted. A player 201 is shown as a device corresponding to the user device 104. The player 201 has a secure decoder 202 therein. The player 201 is, for example, a portable audio recording and/or reproducing apparatus. In FIG. 2, as shown by a broken line, music contents has been recorded and stored in a medium (optical disc, memory card, etc.) which is reproduced by the player 201. As a method of distributing or delivering the music contents, various methods can be used as shown in FIG. 1.

Reference numeral 204 denotes a listening right data charger as a user terminal. The data charger 204 exists between the secure decoder 202 of the player 201 and the settlement center 110 or a data sales terminal 206 installed in a record shop, a convenience store, or the like and functions as a listening right data relay.

Figure 3:
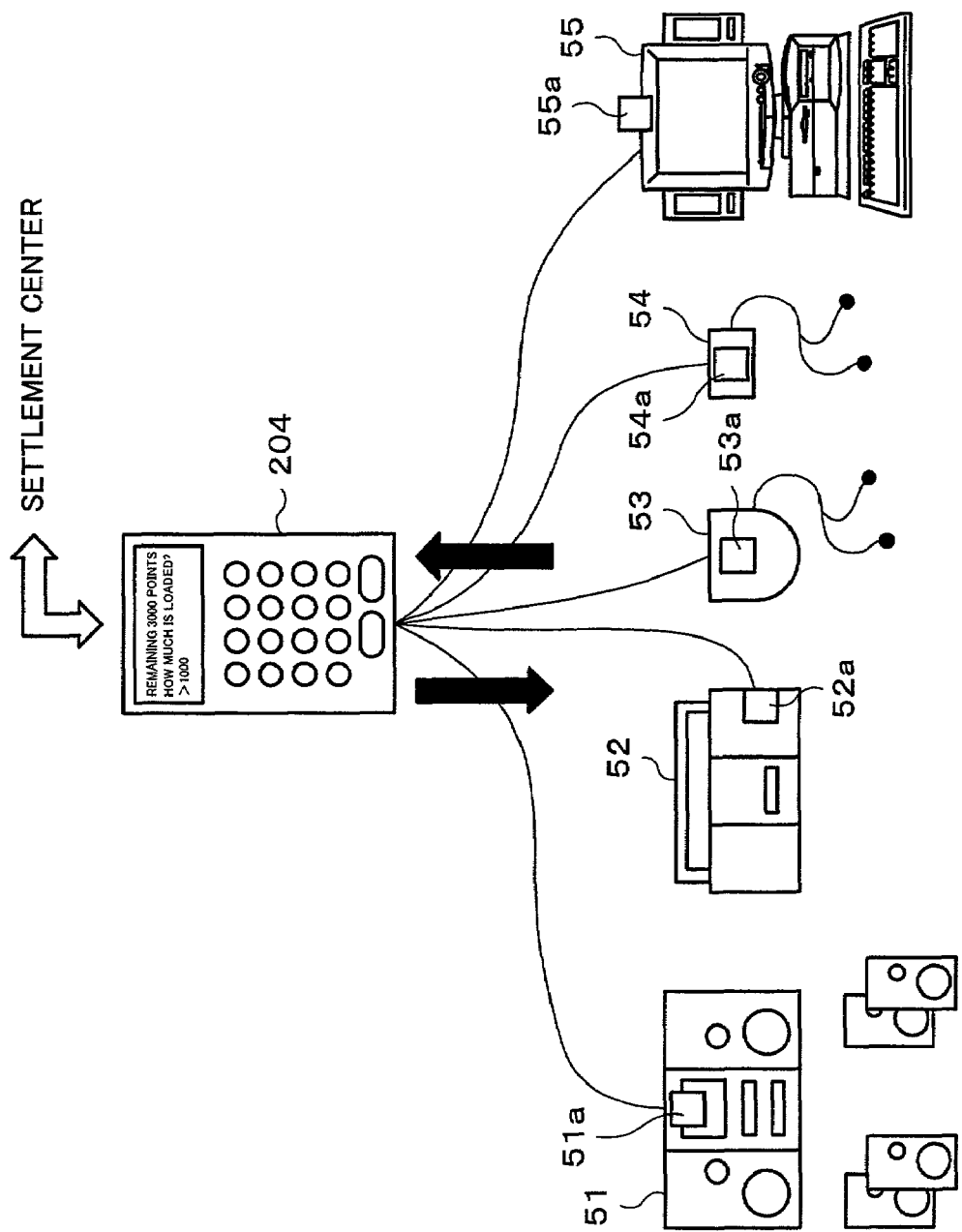
FIG. 3 is a block diagram for explanation regarding a listening right data charger in the embodiment of the invention.

FIG. 3 schematically shows functions of the data charger 204. In FIG. 3, a specific example of the player 201 having a possibility that it is installed in a home. Reference numeral 51 denotes an audio reproducing apparatus in which an amplifier and speakers are separated; 52 a reproducing apparatus in which a tuner and a CD player (or MD recorder) are integrated; 53 a portable CD player; 54 a portable MD player; and 55 a personal computer. Those user devices are equipped with secure decoders 51a, 52a, 53a, 54a, and 55a each having an IC construction. The data charger 204 is shared by those user devices and a transmission of the listening right data and an extraction of reproduction history information can be performed by a dedicated connecting line, a contactless radio communication, a USB (Universal Serial Bus), or an IEEE (Institute of Electrical and Electronics Engineers) 1394. The data charger 204 has a portable structure.

The secure decoder 202 in the player 201 and the data charger 204 communicate through a wire or radio communication path. The listening right data 109 is transferred from the data charger 204 to the memory in the secure decoder 202. The listening right data 109 corresponds to information indicative of, for example, the number of reproduction possible times or a reproduction possible time of the player 201.

The reproduction history information (reproduction log) of the player 201 is transmitted from the player 201 to the data charger 204 through a wire or radio communication path 205. The reproduction log includes an identifier of the decoded digital data and/or decoding conditions. Specifically speaking, it includes information such as kind of listened music contents, the number of reproducing times, reproducing time, and the like. The reproduction log includes an identifier to specify a charge target person such as holder of the user terminal, identifier of the user device, or the like. The secure decoder 202 and data charger 204 makes an authentication as necessary. When the authentication is satisfied, the encrypted listening right data and the reproduction log are transmitted.

The listening right data 109 is sent from the settlement center 110 to the data charger 204 through a communication path 207, for example, a telephone line, or the listening right data 109 sent from the settlement center 110 to the sales terminal 206 through a communication path 209 is supplied to the data charger 204 through the communication path 205. Also in this case, the authentication and encryption are performed for the purpose of assuring the security.

The reproduction log extracted to the data charger 204 is sent to the settlement center 110 through the communication path 207 or supplied to the sales terminal 206 through the communication path 205. When the listening right data 109 is received from the settlement center 110 through the communication path 209, the sales terminal 206 sends the reproduction log to the settlement center 110. Further, the sales terminal 206 pays the costs of the obtained listening right data to the settlement center 110. The communication path 209 is the telephone line, Internet, or the like.

The listening right data 109 and the reproduction log are transmitted and received between the settlement center 110 and the listening right data charger 204 through the communication path 207. Also in this case, the authentication and the encryption are performed for the purpose of assuring the security. The bank/credit card company 208 exists with regard to the settlement of the listening right data 109. On the basis of a request from the settlement center 110, the bank/credit card company 208 withdraws an amount of money corresponding to the listening right data written into the data charger 204 from the user's bank account which has previously been registered.

Further, the settlement center 110 receives delegation of a management of services regarding the listening right data 109 from the record company 101. The settlement center 110 provides techniques regarding the listening right data 109 to the record company 101 and, further, pays a music piece listening fee. As described with reference to FIG. 1, the record company 101 registers the copyright into the copyright management organization 103, thereby requesting a management of the copyright and receives the copyright fee from the copyright management organization 103.

Although not shown in FIG. 2, the listening right data charger 204 can transfer, add, or divide a part or all of the listening right data to/from another charger through a communicating apparatus, for example, a contactless communicating apparatus. The data charger 204 can transfer the listening right data 109 to a prepaid card having a construction of an IC card besides the secure decoder 202 of the player 201.

Figure 4:
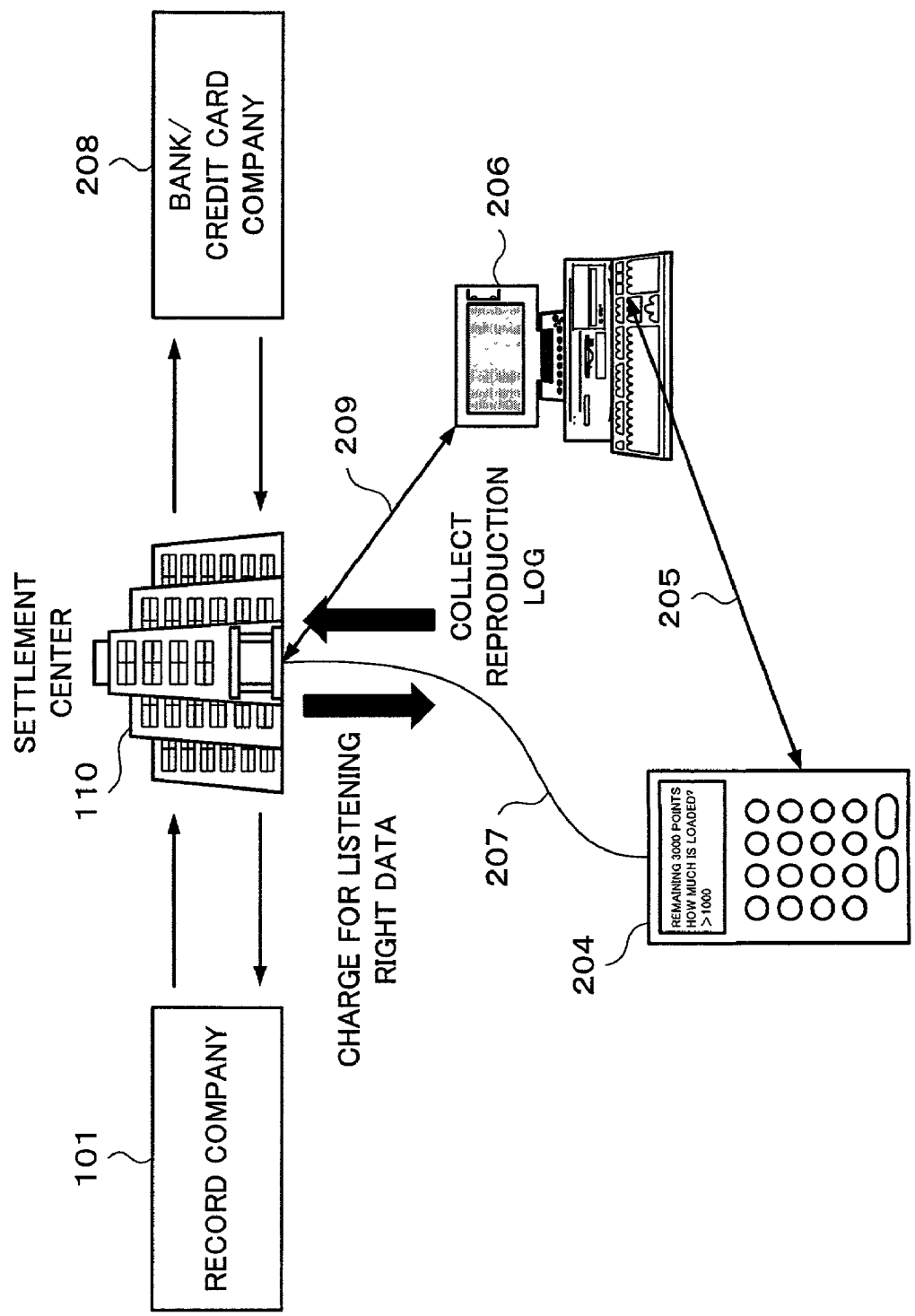
FIG. 4 is a block diagram for explanation regarding the listening right data in the embodiment of the invention.

FIG. 4 shows a mutual relation among the record company 101, settlement center 110, listening right data charger 204, listening right data sales terminal 206, and bank/credit card company 208 in the charge processing system shown in FIG. 2. The settlement center 110 has functions for selling the listening right data 109 between the center and the charger 204 and sales terminal 206, collecting the reproduction logs, and makes a settlement of the costs on the basis of the listening right data.

Figure 5:
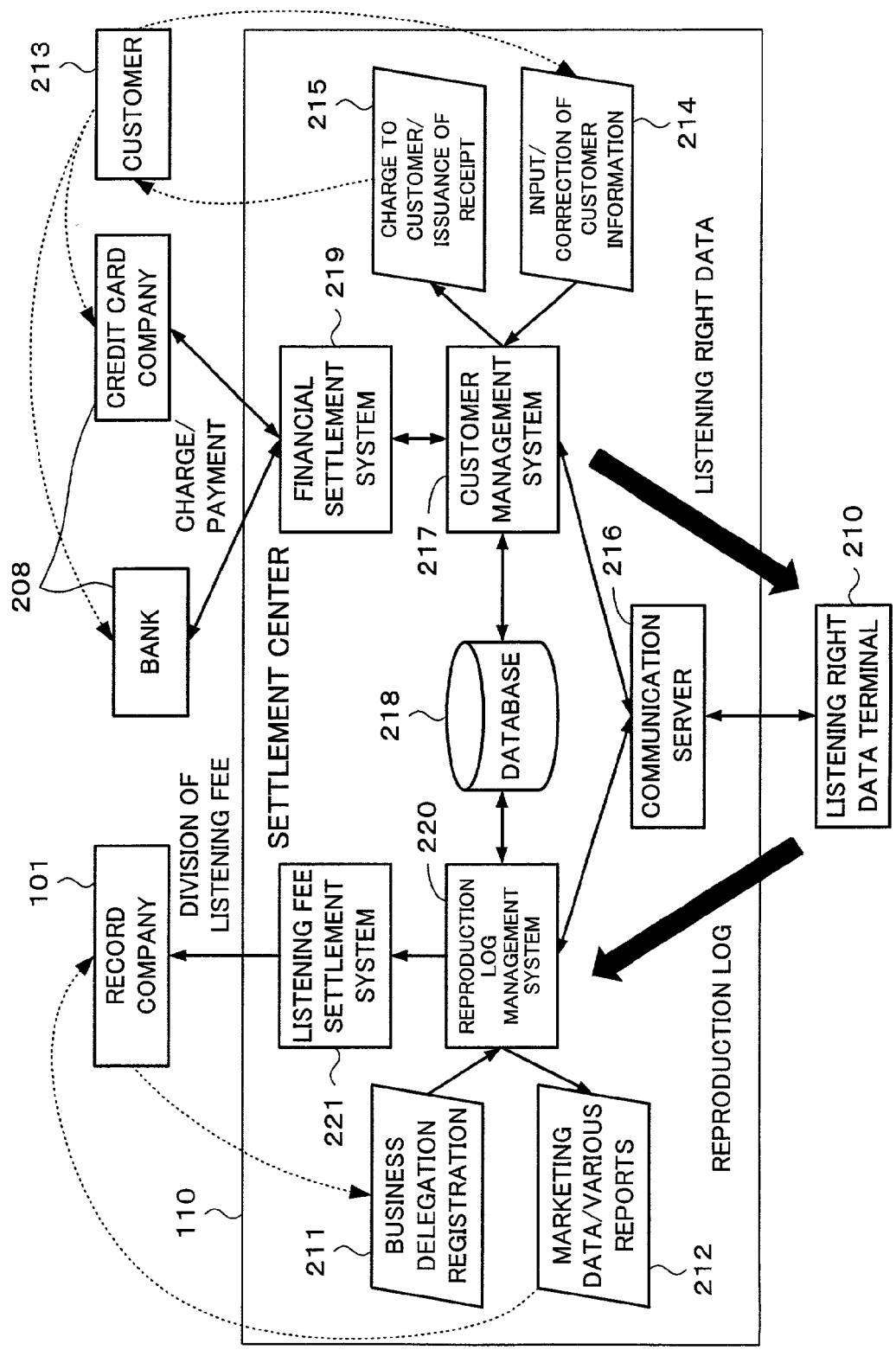
FIG. 5 is a block diagram for explanation regarding a function which is fulfilled by a settlement center in the embodiment of the invention.

FIG. 5 shows in more details the functions of the settlement center 110 connected to a listening right data terminal 210 (listening right data charger 204 or sales terminal 206). In FIG. 5, paths shown by solid lines denote processes which are necessary when the charging process is executed and paths shown by broken lines denote processes which are necessary as a preparation to execute the charging process. In many cases, the processes of the paths shown by the broken lines are executed by mail (transmission and reception of a document) and the processes of the paths shown by the solid lines are executed by using data communication.

The processes by the paths of the broken lines will be first described. Between the record company 101 and settlement center 110, the record company 101 performs a business delegation registration to the settlement center 110 (block 211). The settlement center 110 sends marketing data to the record company 110 and issues various reports (block 212).

A customer 213 as a holder of the listening right data charger 204 makes a contract such as payment of the fee, withdrawal of the fee from the account, and the like with the bank/credit card company 208. The customer 213 reports a change or the like of the contents of the contract to the settlement center 110, and the settlement center 110 inputs or corrects customer information (block 214). The settlement center 110 issues and mails-a bill and a receipt to the customer 213 (block 215).

Processes by the paths of the solid lines will be subsequently explained. The settlement center 110 sends the listening right data 109 to the listening right data terminal 210 in response to a request from the customer. In this case, the customer is specified and data to which the authenticating and encrypting processes have been performed is sent through a communication server 216. A customer management system 217 specifies the authenticated customer with reference to the customer information in a database 218. On the basis of an amount of transferred listening right data 109, a financial settlement system 219 is requested to withdraw the fee from the bank account of the customer. The financial settlement system 219 requests the bank/credit card company 208 to pay the fee from the customer's account, so that payment of the fee is executed. When the settlement center 110 receives a report indicative of the completion of the payment from the financial settlement system 219, a receipt to the customer is issued.

The listening right data terminal 210 is authenticated before the settlement center 110 transfers the listening right data 109 to the listening right data terminal 210. The reproduction log is transmitted from the listening right data terminal 210 to the settlement center 110 through the communication server 216. The encryption performed to the transmitted reproduction log is decoded to by the communication server 216 and the decoded reproduction log is sent to a reproduction log management system 220. The reproduction log includes: a terminal identifier to specify the customer (listening right data terminal 210); an identifier to specify the decoded and reproduced music contents; and data of the number of listening times of each music contents, its time, and its period. The terminal identifier is mainly used for performing the authentication or the like of the data terminal 210 at the time of transferring the listening right data 109 as mentioned above or used for the charging corresponding to the listening right data 109.

The reproduction log management system 220 once stores the reproduction log into the database 218 and sends the reproduction log or the data obtained by processing the reproduction log by a batch process to a listening fee settlement system 221 at every predetermined timing, for example, every month. The listening fee settlement system 221 calculates a listening fee (copyright use fee) of each music piece with reference to information of the music piece or the like registered in the database 218 when the business is delegated from the record company 101. It is also possible to calculate the listening fee every item such as composer, song writer, singer, player, or the like other than the music piece. The listening fee of each music piece calculated by the listening fee settlement system 221 is paid to the record company 101.

As mentioned above, the settlement center 110 transfers the listening right data 109 to the customer 213 and requests the listening fee from the customer 213. On the other hand, the settlement center 110 executes processes for calculating and distributing the listening fee of each music piece. Therefore, it is unnecessary that the record company 101 executes operations for performing a customer management and calculating and distributing the listening fee. Since the settlement center 110 is an organization which is independent of the record company 101, contracts of business delegation can be made with a plurality of record companies, and the number of kinds of music contents which can be selected by the customer can be increased.

Figure 6:
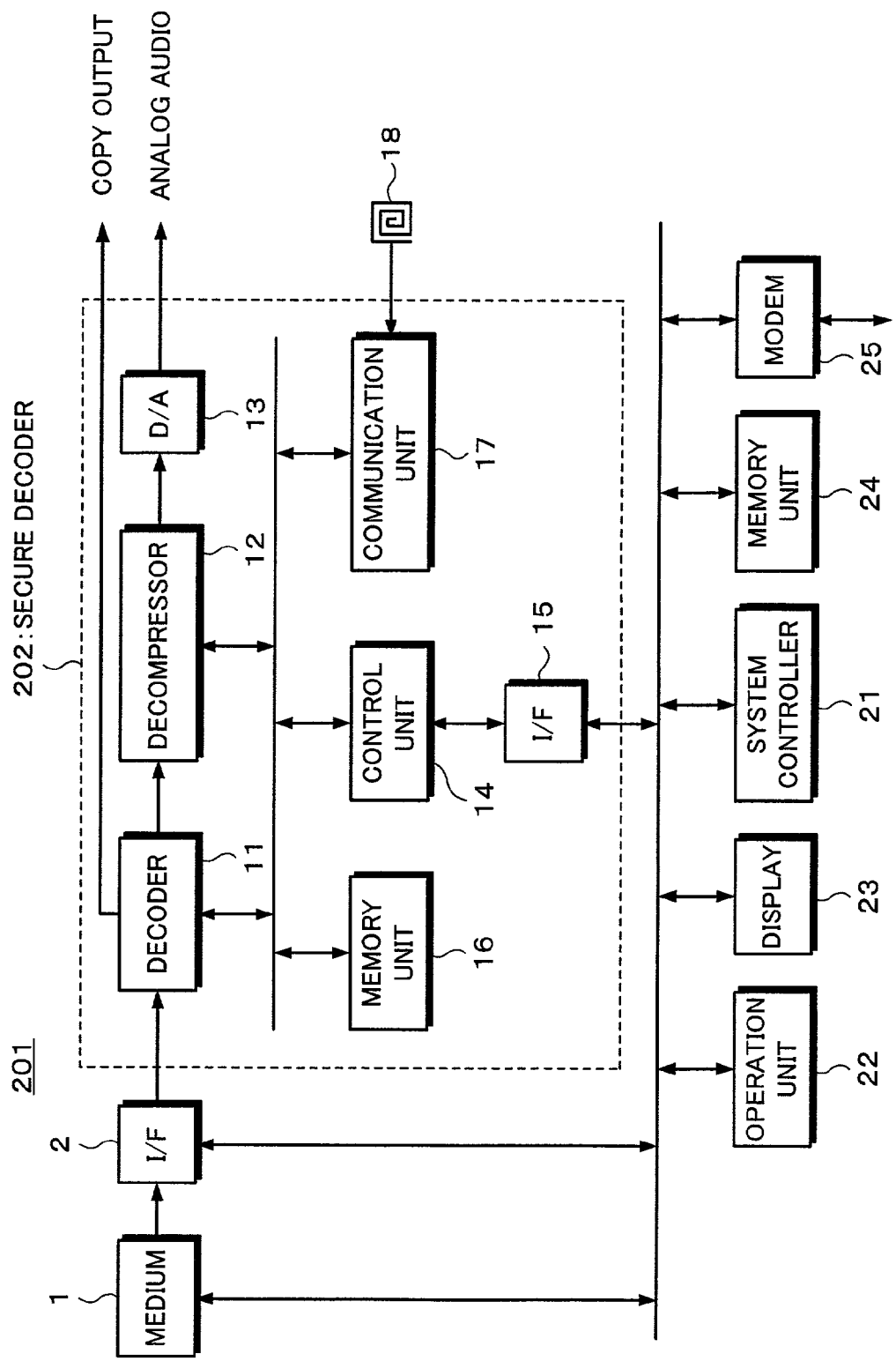
FIG. 6 is a block diagram of an example of a player in the embodiment of the invention.

FIG. 6 shows a construction of signal processes of the player 201 having the secure decoder 202. The secure decoder 202 is constructed as an IC of one chip as shown by a broken line. The secure decoder 202 has what is called a tamper resistant construction. That is, it has a construction such that the contents in the secure decoder 202 cannot be known from the outside and the secure decoder 202 cannot be falsified.

The compression encoded or encrypted music data has been recorded in a medium 1. Further, the compression encoded or encrypted data is associated with data necessary for the reproduction charging process, in this case, the music data. Hereinafter, the compression encoded or encrypted data is referred to as contents data and the data for the reproduction charging process is referred to as subordinate data. In the invention, it is not always necessary that both of the compression encoding and the encryption are performed. Even only the compression encoding is performed, the purpose of protection of the copyright can be accomplished so long as its decoding method is not open.

A memory card, a recordable optical disc, a read only optical disc, or the like can be used as a medium 1. In case of the recordable medium, as mentioned above, data distributed through a network such as satellite network, cellular phone network, Internet, or the like can be downloaded. The contents data and the subordinate data recorded on the medium 1 are supplied to the secure decoder 202 through an interface 2. An analog audio signal based on the contents data is outputted from the secure decoder 202. The analog audio signal outputted from the secure decoder 202 is reproduced by speakers, headphones, or the like through an amplifier or the like.

The secure decoder 202 has a decoder 11 of the encryption, a decompressor 12 of the compression encoding, and a D/A converter 13. A DES (Data Encryption Standard) can be used as an encryption which is performed to the contents data. The DES is one of block encrypting methods for dividing a plane sentence into blocks and executing an encryption conversion every block. According to the DES, the encryption conversion is executed to an input of 64 bits by using a key of 64 bits (a key of 56 bits and a parity of 8 bits) and 64 bits are outputted. An encryption other than the DES can be also used. For example, although the DES is based on a common key system using the same key data for encryption and decoding, it is also possible to use an RSA encryption as an example of a public key encryption using different key data for encryption and decoding. As mentioned above, for example, the key data is sent to the user device 104 whose authentication has been satisfied with the server 111.

The secure decoder 202 comprises: a control unit 14 including a CPU; a CPU interface 15 for performing communication between the control unit 14 and an external CPU; a memory unit 16; and a communication unit 17 and an antenna 18 for receiving the listening right data from the prepaid charger and transmitting the reproduction log to the prepaid charger. The control unit 14 receives the subordinate data separated at the front stage of the decoding in the decoder 11 and executes a control for decoding and decompression. The communication unit 17 and antenna 18 are used for communicating with the listening right data charger 204 in a contactless manner. This communication is executed by using an encrypted protocol under a condition that the authentication is made between the secure decoder 202 and charger 204. Since a supply of not only the data but also an electric power can be received To from the charger 204, even if a power source of the whole player 201 is OFF, the secure decoder 202 can receive the listening right data 109 and transmit the reproduction log to the charger 204. The listening right data 109 received from the charger 204 is stored into the memory unit 16. Further, the reproduction log which is caused due to the reproduction of the contents data which is executed by the player 201 is also stored into the memory unit 16. The memory unit 16 is a non-volatile memory whose storage contents are held even if a power source is turned off.

A copy output of the contents data or the like can be outputted from the decoder 11 to the outside of the secure decoder 202. Whether the copy of the contents data or the like is outputted or not is controlled by the control unit 14. The copy output which is outputted is the subordinate data and the contents data. Further, the decoder 11 and decompressor 12 have functions for omitting a decoding process and a decompressing process on the basis of a control signal and a control command from the control unit 14, respectively. Thus, for example, even if the contents data read out from the medium 1 is audio data or a linear PCM signal which is not inherently encrypted nor compression encoded, it can be reproduced.

A system controller shown at reference numeral 21 is provided to control the whole operation of the player 201. The system controller 21 is constructed by a CPU and controls the operation of the secure decoder 202 by communicating with the control unit 14 in the secure decoder 202. An operation unit 22, a display 23, a memory unit 24, and a modem 25 are connected to the system controller 21 through a bus. Further, the system controller 21 controls the reproducing operation of the medium 1 and the operation of the medium interface 2 on the basis of, for example, an operation input from the operation unit 22.

The operation unit 22 comprises a plurality of switches, a plurality of keys, and the like which are operated by the user and generates the control signal for controlling the operation of the player 201. The display 23 is constructed by, for example, a liquid crystal display device, displays, for instance, a menu for allowing the user to control the operation of the player 201 by using the operation unit 22, and displays an operating mode of the player 201. The memory unit 24 is an external memory provided because a capacity of a memory in the system controller 21 is small. The modem 25 is connected to a public line and used for data communication with the outside or an external apparatus. For example, by transferring the reproduction log in the memory unit 16 of the secure decoder 202 to the memory unit 24, the remaining number of reproduction possible times or the reproduction possible time can be displayed on the display 23, or the reproduction log can be transmitted to an external apparatus such as communication server 216, settlement center 110, or the like through the modem 25. Further, the player 201 can also receive the listening right data 109 through the modem 25.

The user operates the operation unit 22, theby instructing the system controller 21 to reproduce desired contents in the medium 1. If the contents to be reproduced is free with respect to the reproduction, even if the analog output is generated by passing through the secure decoder 202, the listening right data 109 stored in the memory unit 16 is not changed. If the contents to be reproduced is contents as a target of the charging for the reproduction which is charged for each time it is reproduced, the listening right data 109 in the memory unit 16 is changed, for example, it is subtracted by "1" as mentioned above. As a charging process which is executed each time the contents is reproduced, that is, each time the contents data is decoded, various types are possible. The charging process in the invention is mainly classified into: a buying type; a type in which the monitoring fee is charged in gross; and a degree type in which the monitoring fee is charged each time the encryption performed to the contents data is decoded in the secure decoder 202. The buying type is a type such that after the contents data is once bought, the reproducing process of the contents data is not charged for. The type of grossly charging the monitoring fee is classified into a type of a monthly contract such that the monitoring fees are collectively paid, a type such that a monitoring period and a monitoring time of the contents are limited, and the like.

Several forms are possible as a degree type of charging the monitoring fee each time the encryption performed to the contents data is decoded by the secure decoder 202. According to the first form, each time the reproducing process of the contents data is executed, a money amount or a degree is subtracted from a preset money amount (prepaid card, electronic money) or degree. If a balance or a remaining degree lacks upon reproduction of the contents, the contents cannot be reproduced. According to the second form, a money amount or a degree is added each time the reproducing process of the contents data is executed. When the accumulated money amount or accumulated degree reaches the money amount or degree which has been preset, the contents cannot be reproduced. According to the third form, the degree or money amount is added or subtracted in accordance with the reproducing time of the contents.

The money amount or degree which is used in the degree type of charging the monitoring fee mentioned above can be made constant or the money amount or degree can be also weighted in accordance with the kind or the like of the contents to be reproduced. The charging process is performed in correspondence to one title of the contents (in an example of music; one music piece) or a plurality of titles of the contents (in an example of music; album).

As a method of defining the reproducing process of the contents data, in the case where the whole contents has been reproduced, it can be defined such that the contents was reproduced. In the case where the reproducing time of the contents is equal to or longer than a predetermined time, it can be also defined such that the contents was reproduced. Further, the reproduction of the contents for promotion for promoting spread and circulation cannot be charged either. Even in case of contents serving as a target of charging upon reproduction of the contents, for example, the reproduction of a head portion of the contents, for instance, 10 seconds from the head of the contents can be made free or the reproduction of only the highlight portion of the contents can be made free. As mentioned above, in the case where the contents whose reproducing process of the contents data is charged for and the contents whose reproducing process of the contents data is free exist mixedly and have been recorded on, for example, the medium 1, the charge/free is discriminated by the subordinate data upon reproducing process, that is, decoding of the contents data.

The subordinate data is the data added before the contents data (compression encoded and encrypted contents; for example, audio data). The subordinate data is encrypted as necessary. The subordinate data is added before the contents data and recorded onto a recordable medium or recorded into an area for data management on the medium 1. In case of a read only medium, subordinate data is recorded into the data management area. In case of an optical disc, generally, the management area is provided in an area on the innermost rim side of the disc. The subordinate data corresponding to each contents data is recorded in this management area. In case of the memory card, for example, file management data such that one music piece of the music data is handled as one file is specified. The subordinate data is recorded in a memory area where the file management data is stored.

The subordinate data includes: a charge identifier for indicating whether the contents is contents to be charged for upon reproduction or free contents; and a reproducing conditions label for distinguishing the charge type such as buying type, gross type, degree type, or the like as mentioned above and instructing the charge conditions in each charge type. For example, when the charge type is the buying type, the data regarding the buying price of the contents data is described on the reproducing conditions label. In case of limiting the number of reproducing times of the gross type as a charge type, the data of an upper limit or the like of the number of reproducing times of the contents is described on the reproducing conditions label. In case of limiting the reproducing period of the gross type as a charge type, the data (1 day, 1 week, 1 month, etc.) of the reproducing period of the contents is described as a reproducing conditions label. In case of the degree type as a charge type, data of the degree (¥1/2 minutes, ¥1/1 minute, ¥1/30 seconds, . . . ) is described as a reproducing conditions label. Further, even in case of the contents which is charged for as a prerequisite upon reproduction, the conditions in the case where the contents can be monitored free of charge can be also described on the reproducing conditions label.

Information indicative of the kind of compression encoding of the contents data, information indicative of the kind of encryption and parameters of the encryption, information indicative of the number of channels, information indicative of a bit rate, and the like can be also recorded in the subordinate data.

A media ID, for example, a serial number for enabling the media such as CD, MD, recordable optical disc, memory card including a non-volatile memory, and the like to be unconditionally identified is included in the subordinate data. Further, a decoder ID is arranged in the subordinate data. The decoder ID is an ID, for example, a serial number for enabling a user's terminal and the secure decoder 202 built in the player 201 or the like of the user to be unconditionally identified.

Figure 7:
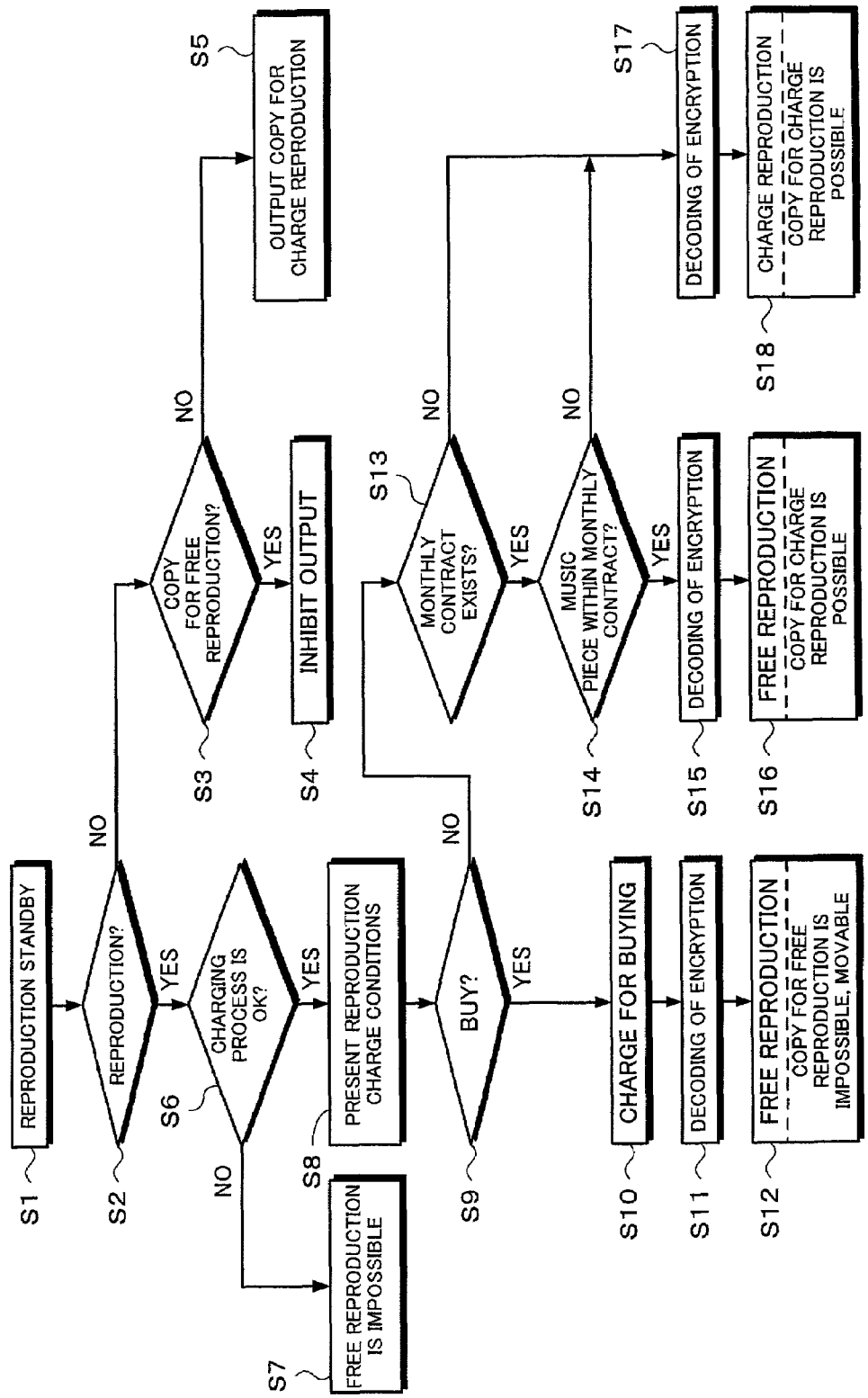
FIG. 7 is a flowchart for explaining an example of a charging process in the embodiment of the invention.

An example of the charging process which is executed in the player 201 (refer to FIG. 6) will now be described with reference to a flowchart of FIG. 7. This process is executed by the control unit 14 in the secure decoder 202 and the system controller 21 of the player 201. First step S1 indicates a reproduction standby mode in which the contents data to be reproduced exists in the medium 1. Specifically speaking, a case where the contents data distributed by the EMD has been stored in the medium 17 a case where the contents data has already been recorded in the medium 1, or the like corresponds to the reproduction standby. In step S2, the user depresses a play button of the operation unit 22, so that whether the reproduction has been instructed or not is discriminated.

If a result in step S2 indicates NO, it is decided that this means the copying operation of the contents data. In step S3, whether the contents data for free reproduction is copied or not is discriminated. The contents data for free reproduction denotes the contents which is not charged for due to the reproduction. The discrimination in step S3 is made with reference to the charge identifier included in the subordinate data. If the contents is the contents for free reproduction, the copy output of the data from the secure decoder 202 in which the encryption performed to the contents data has been decoded is inhibited for the purpose of protection of the copyright (step S4).

If it is determined in step S3 that the contents is not the copy of the contents data for free reproduction, that is, if it is decided that the contents data for free reproduction is copied, the copy data of the contents data for charge reproduction is outputted from the secure decoder 202 (step S5). The contents data for charge reproduction is freely outputted from the secure decoder 202. This copy output which is outputted here, however, that is, the copy data is the subordinate data and the encrypted and compression encoded contents data.

If it is decided in step S2 that the reproducing operation has been instructed by the user by using the operation unit 22, whether the charging process is permitted or not is inquired of the user of the player 201 in step S6. For example, a message indicative of the necessity of the charging process is displayed onto the display 23 of the player 201, thereby promoting the user so as to answer to the charging process by the operation of the operation unit 22 on the basis of the display on the display 23. If the user does not permit the charging process, the free reproduction of the contents data cannot be performed (step S7). There is also a case where a situation such that the partial free reproduction of the contents, for example, the reproduction of the head portion or highlight portion of the music piece as contents is executed free of charge is permitted by the reproducing conditions label of the subordinate data. If the user permits the charging process which is necessary for reproduction of the contents, the reproduction charge conditions regarding the contents to be reproduced at present are presented on the display 23 to the user in step S8. At this time, the charge conditions are presented on the display 23 on the basis of the information of the reproducing conditions label in the subordinate data corresponding to the contents to be reproduced.

In step S9, whether the charge type is the buying type or not is discriminated. If the charge type is the buying type, the charging process for buying is performed (step S10). In step S11, the encryption performed to the contents data is decoded in the decoder 11 of the secure decoder 202 by using the key data sent from the server 111. In step S12, the free reproduction of the contents is performed. In this case, the copy output of the contents which is reproduced free of charge is inhibited. If the moving process, that is, the process which enables the decoding and reproduction of the contents data which does not remain in the player serving as a moving source in a state where the contents data as a moving target can be reproduced but becomes the moving target only on the player side serving as a movement destination unlike the copy can be performed.

If it is determined in step S9 that the charge type is not the buying type, whether the charge type is the gross type, for example, the monthly contract type or not is determined in step S13. When the monthly contract exists and the charge type is the monthly type, whether the contents to be reproduced is the monthly contracted music piece or not is discriminated in step S14. If it is decided in step S9 that the contents data to be reproduced is the monthly contracted contents, the charge reproduction of the contents is performed in step S15. In this case, the copy output of the contents for free reproduction can be freely performed from the secure decoder 202.

If it is decided in step S13 that the charge type is not the monthly contract type, it is determined that the contents to be reproduced is the contents which is subjected to the charging process in the degree type. In step S17, the encryption performed to the contents data to be reproduced is decoded. In step S18, the charge reproduction of the contents is executed. In the charge reproduction which is performed in step S18, as mentioned above, the charging process is performed in accordance with the degree of reproduction of the contents, the reproducing time, and the like. Since the copy of the contents for charge reproduction is freely outputted from the secure decoder 202, the user can freely copy them. Further, even if it is determined in step S14 that the reproducing operation does not lie in a range of the monthly contract, that is, it has already exceeded the range of the monthly contract, the charge reproducing process in which the charge type is the degree type (step S17, step S18) is performed.

Figure 8:
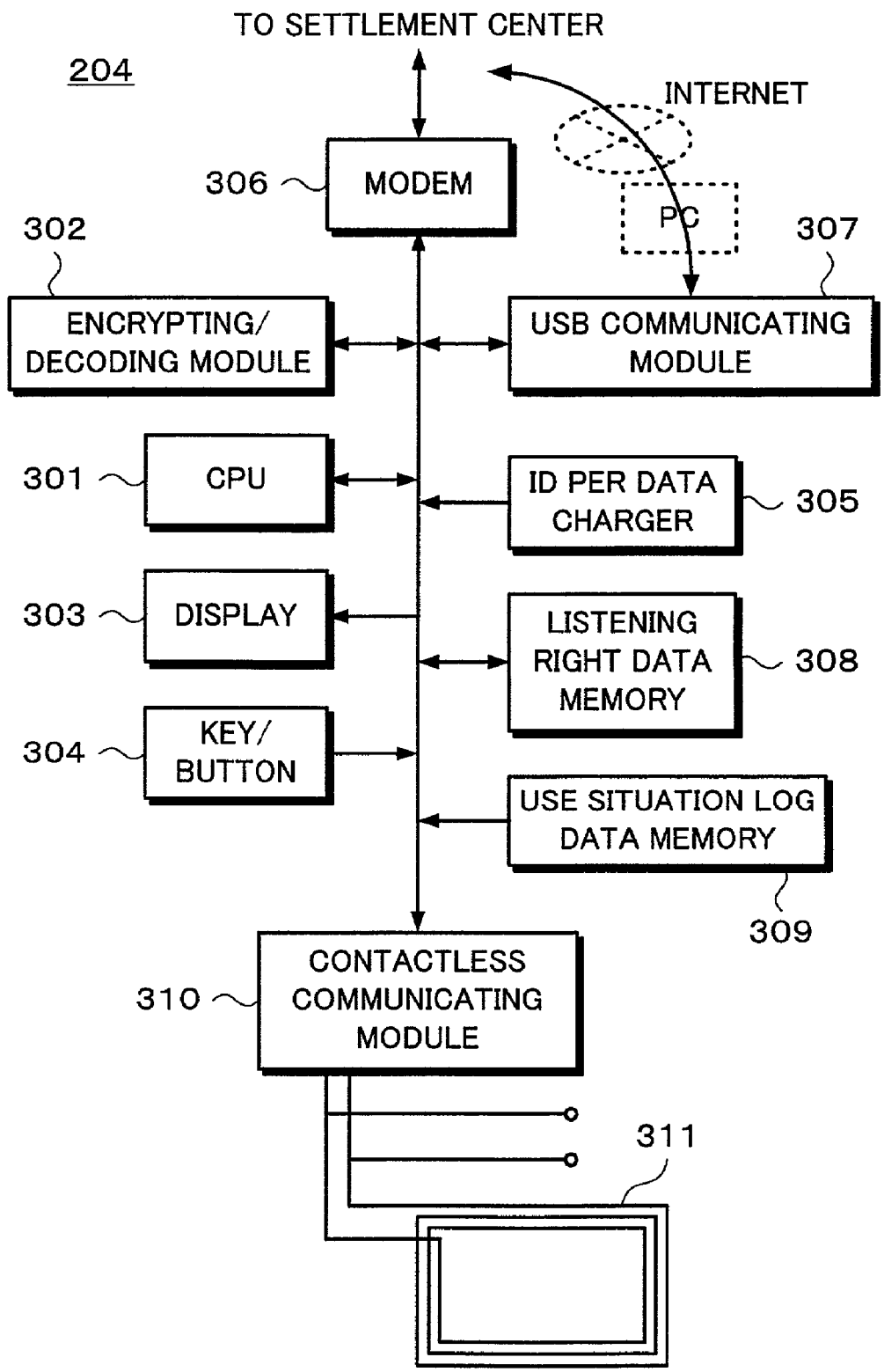
FIG. 8 is a block diagram of an example of the listening right data charger in the embodiment of the invention.

FIG. 8 shows a construction of an example of the listening right data charger 204. The charger 204 is an apparatus of, for example, a portable type in which it can be carried. Reference numeral 301 denotes a CPU for controlling the whole charger; 302 an encrypting/decoding module; 303 a display (for example, liquid crystal display); and 304 a plurality of keys/buttons which are operated by the user. A menu, charge processing conditions, and the like regarding the operation of the charger 204 are displayed on the display 303. The encrypting/decoding module 302 executes the encrypting process upon transmission of the reproduction log or the like which is executed between the module 302 and the player 201, settlement center 110, or the like and the decoding process of the encryption upon reception of the listening right data 109 or the like. Reference numeral 305 denotes an individual ID of the data charger 204. The individual ID 305 of the data charger is transmitted to, for example, the settlement center 110, for example, together with the reproduction log, thereby enabling a correspondence relation between the data charger 204 and the reproduction log to be known on the settlement center 110 side.

For instance, a modem 306 and a USB (Universal Serial Bus) communicating module 307 are provided for communication with the settlement center 110 in FIG. 2. The data charger 204 communicates with the settlement center 110 by the modem 306 through a telephone line, can receive the listening right data 109 from the settlement center 110, and transmit the reproduction log to the settlement center 110. The data charger 204 can also similarly communicate with the settlement center 110 by the personal computer and the Internet by using the USB communicating module 307.

The listening right data 109 received from the settlement center 110 by the data charger 204 is stored into a listening right data memory 308. The reproduction log received from the secure decoder 202 of the player 201 is stored into a use situation memory 309 of the charger 204. Log data obtained by adding the log of the charger 204 to the reproduction log is transmitted to the settlement center 110 as necessary. The memories 308 and 309 are non-volatile memories such that the memory contents are held even if the power source is turned off.

A contactless communicating module 310 and an antenna 311 are used for communicating with the player 201 in a contactless manner. The communication which is executed between the charger 204 and player 201 is performed by using an encrypted protocol under a condition that the authentication is mutually performed between the charger 204 and player 201. The charger 204 can transmit not only the data but also an electric power necessary for making the secure decoder 202 of the player 201 operative to the player 201. Therefore, even if the main power source of the player 201 is OFF, the listening right data 109 and the reproduction log can be transmitted and received between the secure decoder 202 and charger 204. Besides the antenna 311, a terminal for line connection is also provided for the charger 204. The charger 204 communicates with the listening right data sales terminal 206 by using the contactless communicating module 310 and antenna 311 or lines.

Figure 9:
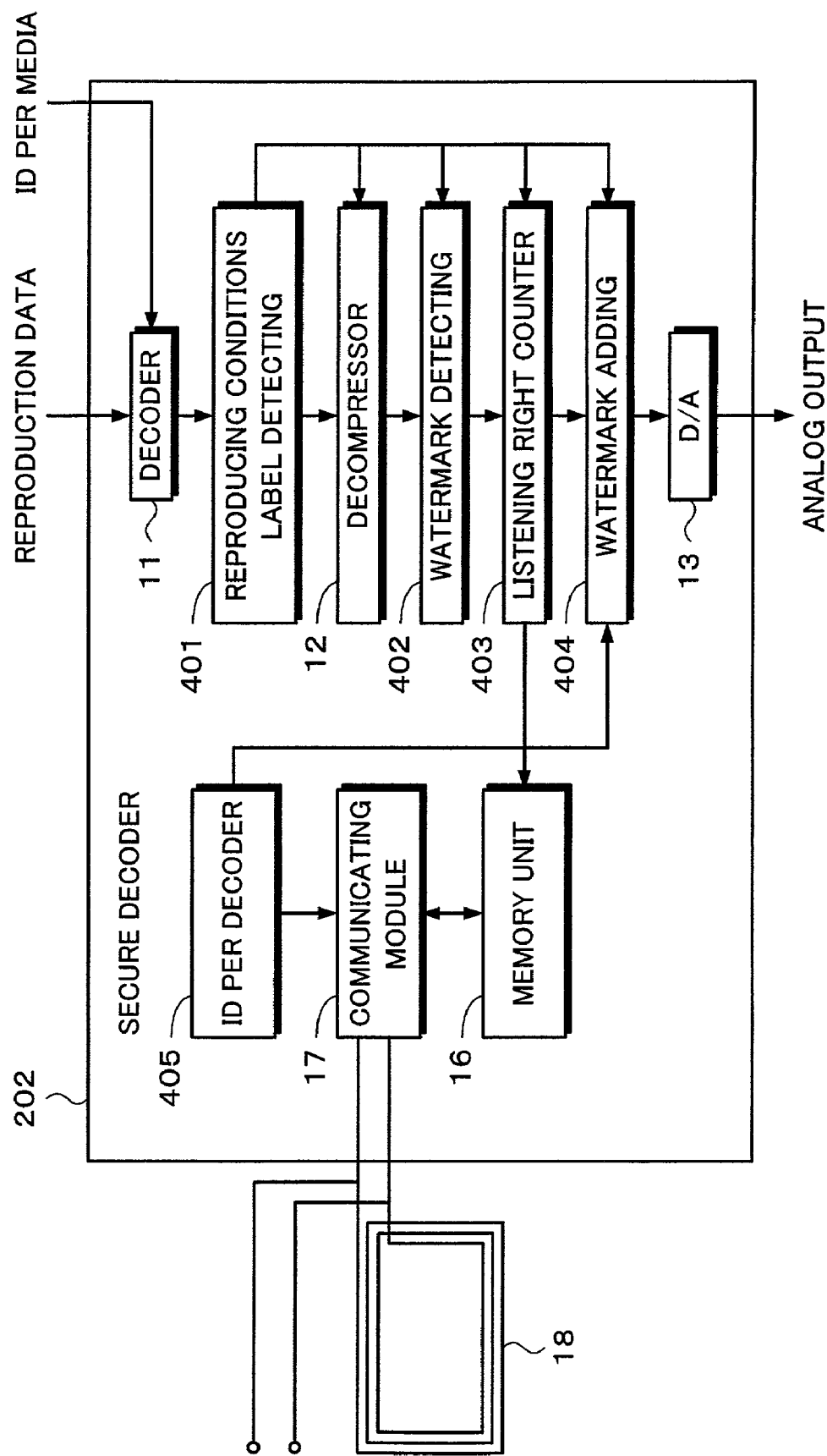
FIG. 9 is a more detailed block diagram of a secure decoder in the embodiment of the invention.

FIG. 9 shows a more detailed construction of the secure decoder 202, that is, a functional construction regarding the charging process. Portions common to the component elements shown in FIG. 8 in the construction shown in FIG. 9 are designated by the same reference numerals as those used in FIG. 8. The reproduction data comprising the encrypted and compression encoded contents data and subordinate data read out from the medium 1 is supplied to the decoder 11. The ID per media for enabling the medium 1 to be unconditionally identified is also supplied to the decoder 11 together with the contents data and subordinate data. The encryption performed to the contents data and subordinate data is decoded by the decoder 11.

The output data of the decoder 11 is supplied to a reproducing conditions label detecting unit 401 and the reproducing conditions label in the subordinate data is detected. The detected reproducing conditions label is used for the process of the secure decoder 202. The data whose encryption has been decoded by the decoder 11, that is, the output data is supplied to the decompressor 12, and the compression encoding is decoded by the decompressor 12. The digital data decompressed by the decompressor 12 is supplied to a watermark detecting unit 402. The watermark detecting unit 402 detects the watermark added at the time when the contents data is converted into an analog signal and outputted from the decoder 204 as will be explained hereinlater, and discriminates whether the reproducing conditions label of the subordinate data has been falsified or not on the basis of the detected watermark and the reproducing conditions label. For example, if the watermark cannot be detected or a format of the detected watermark differs from that of the watermark to be inherently detected, it is determined that the reproducing conditions label has been falsified.

Reference numeral 403 denotes a listening right counter. In the listening right counter 403, each time the contents data is decoded, the listening right data 109 is changed. For example, the counter 403 executes a process for subtracting the listening right data 109, for example, degree data stored in the memory unit 16 by "1". The listening right data 109 stored in the memory unit 16 is the data transmitted from the foregoing listening right data charger 204 by the antenna 18 (or line) and communicating module 17. A module for encrypting upon transmission of the reproduction log or the like and a module for decoding upon reception of the listening right data 109 are provided in the communicating module 17. Since the invention has been described by using an example of handling the music piece data as contents data, a terminology "listening right" is used. However, when considering also including video data, a terminology "monitoring right" is used in place of "listening right".

When the process regarding the listening right is performed in the listening right counter 403, a watermark is added to the data which is outputted from the secure decoder 202 by a watermark adding unit 404. As for the watermark which is newly added by the adding unit 404, the watermark can be added by using a redundant portion existing in the music piece data as contents data, for example, by using lower bits of audio data which is outputted. The watermark added to the lower bits of the audio data as mentioned above is data which remains even if the data is converted into the analog signal and it is impossible or fairly difficult to remove the watermark. The watermark which is added by the adding unit 404 includes data of the whole or a part of the reproducing conditions label and information of an ID 405 per decoder. The digital data to which the watermark has been added is converted into the analog signal by the D/A converter 13 and outputted to the outside from the secure decoder 202. The foregoing watermark detecting unit 402 detects the watermark added as mentioned above.

It is also possible to construct the apparatus in a manner such that the secure decoder 202 has an interface of an IC card and the listening right data charger 204 receives electronic money from the settlement center 110 or a financial company and records the received electronic money into the IC card through the interface which the secure decoder 202 has. That is, the secure decoder 202 can be allowed to have a function as a recording apparatus of the electronic money as an optional device in response to the writing of the listening right data 109.

An outline of the charging process which is executed by the listening right counter 403 will be described. For example, an example in which the invention is applied to a case where the charging process is executed in the degree type as a charge type will be explained. That is, the degree which has been determined uniformly or every contents data is subtracted from the degree which has been preset as listening right data every reproducing process of the music piece data as contents data, the degree is added every reproducing process of the music piece data, or the degree is added or subtracted in accordance with the reproducing time of the music piece data. For example, the reproducing conditions label is extracted from the subordinate data by the reproducing conditions label detecting unit 401. The charge conditions are included in the reproducing conditions label. The subtraction from the degree set as listening right data mentioned above or the count-up of the degree is executed on the basis of the charge conditions. It is also possible to measure a period of time during which the music piece data as contents data is outputted from the decompressor 12 on the basis of a unit time such as 30 seconds, 1 minute, or the like and perform the charging process for charging for a duration of the measured time. That is, in the charging process in this case, the unit time is made to correspond to one degree.

The degree is controlled by the listening right counter 403 on the basis of the measured time and the reproducing conditions label. That is, with reference to the reproducing conditions label extracted by the label detecting unit 401, the counter 403 executes the subtracting or adding process to the listening right data 109 stored in the memory unit 16, thereby rewriting the listening right data 109 in the memory unit 16. When the reproducing time or reproducing period is used as a charge condition, an accumulating process of the reproducing times of the contents or a collating process of the date and time of the reproduction of the contents and the reproduction possible term is executed in the counter 403 by using a timer/calendar (not shown).

The listening right counter 403 or another control unit further discriminates whether the contents can be reproduced or not. For example, each time the contents is reproduced, the counter 403 subtracts the degree which has been set as listening right data. When the remaining degree is equal to "0", it is determined that the reproduction of new contents is impossible. When the accumulated degree as listening right data reaches the set degree, when the accumulated value of the reproducing time of the contents reaches the set time, or when the date and time of the reproduction of the contents expires the reproducing period, the counter 403 decides that the reproduction of new contents is impossible in a manner similar to the case mentioned above. If the counter 403 determined that the reproduction is possible, the music piece data is outputted from the secure decoder 202. If it is determined by the counter 403 that the reproduction is impossible, the output of the music piece data from the secure decoder 202 is inhibited.

According to the embodiment of the invention, when the listening right data 109 is sent from the foregoing settlement center 110 or listening right data sales terminal 206 to the listening right data charger 204 and when the listening right data 109 is sent from the listening right data charger 204 to the player 201, in order to raise the security, the settlement center 110 serving as an issuing source or an administrator can, for example, periodically or irregularly change the encryption which is used.

Figures 10A, 10B:
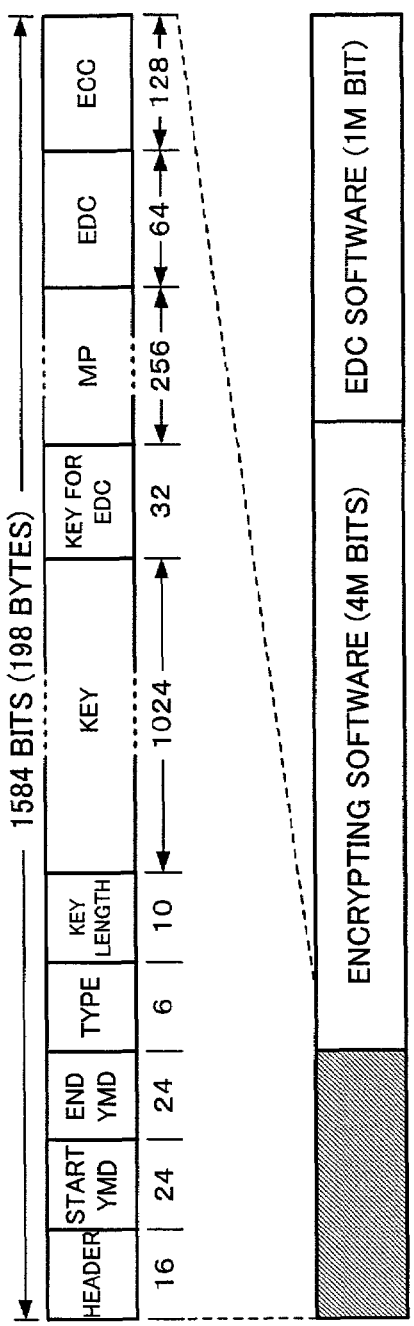
FIGS. 10A and 10B are schematic diagrams of an example of a data construction of the listening right data in the embodiment of the invention.

FIGS. 10A and 10B show examples of a data format in case of sending the listening right data 109. In place of the listening right data which is transmitted from the settlement center 110, electronic money which conforms with a format shown in FIGS. 10A and 10B can be also transmitted from the settlement center 110. FIG. 10A shows a construction of one frame (256 bits). A header (16 bits) is located at the head of the frame. Next to the header, start year/month/day (YMD) and end year/month/day (YMD) are sequentially arranged. A valid period of the listening right data 109 is specified by those data of the start year/month/day (YMD) (24 bits) and end year/month/day (YMD). The year of each of the start year/month/day and end year/month/day is expressed by a binary notation of 15 bits, and the month and the day are expressed by a binary notation of 4 bits and 5 bits, respectively. If the start year/month/day and the end year/month/day are not determined, all of 24 bits are set to bit 0. For example, by preliminarily determining the valid period of the listening right data 109, it is not always necessary to clearly indicate the end year/month/day.

Subsequent to the end year/month/day (YMD), the type of 6 bits indicates the kind of encryption performed to the listening right data. The encryption by the DES (Data Encryption Standard), the encryption by the RSA, or the like can be used. The DES is one of the block encryption systems for dividing a plane sentence into blocks and performing the encrypting conversion every block. According to the DES, the encrypting conversion is executed to an input of 64 bits by using a key of 64 bits (a key of 56 bits and a parity of 8 bits) and 64 bits are outputted. The DES is a common key system using the same key data for encryption and decoding. The RSA is one of public key encryption systems using different key data for encryption and decoding. Any encryption other than them can be also used.

A key length of 10 bits is arranged after the information of the kind of encryption. The key length indicates a length of key for decoding the encryption. A key (1024 bits in the example of FIG. 10A) is arranged after the key length. A key for an EDC (Error Detection Code) of 32 bits and encrypted listening right data MP of 256 bits are arranged after that.

The EDC of 64 bits and an ECC (Error Correction Code) of 128 bits are sequentially arranged after the data MP and a data arrangement of one frame is completed. A CRC (cyclic redundancy code) or the like is used as an EDC. For example, a Reed-Solomon code of (198, 182, 17) is used as an ECC. The ECC starts from a header and is used for detecting the presence or absence of errors of the data up to the EDC. The EDC starts from the start year/month/day (YMD) and corrects errors up to the listening right data MP.

For example, when $(x16+x12+x5+x+1)(x16+x+1)(x32+\_x31+\_x30 \ldots +\_x4+\_x3+\_x2+\_x+1)$ is used as a polynomial of the EDC, for instance, values of coefficients of the underlined portions are arranged in the key (64 bits) for EDC. Therefore, to decode the encryption performed to the listening right data MP, an error correction by the ECC is performed, the key for EDC is obtained, and an error detection by the EDC is subsequently performed. If a result of the error detection indicates OK (no error), the listening right data MP can be decoded. As mentioned above, the security for the encrypted listening right data MP can be raised. Further, it is also possible to scramble (for example, process for making the data random by using a maximum length period (M) series) the whole data as necessary.

FIG. 10B shows another example of a data configuration for transmission of the listening right data 109. Software (for example, 4 Mbits) for performing an encryption is arranged after the data arrangement (shown by a hatched portion) shown in FIG. 10A. Further, EDC software (for example, 1 Mbits) for the encrypting software is arranged. The EDC software has been divided into ECC blocks on a unit basis of, for example, 2 kbytes. According to the data configuration of FIG. 10B, software for decoding the encryption is also sent together.

According to the transmission format of the listening right data 109 mentioned above, although the important portion consists of only 256 bits, this portion is protected by the encryption, EDC, and ECC. Thus, it is possible to prevent the listening right data 109 from being illegally obtained or falsified. Further, in the embodiment of the invention, the settlement center 110 can periodically or irregularly change at least one of the start year/month/day (YMD), key length, key, and key for EDC in the format shown in FIG. 10A. Thus, it is possible to prevent the listening right data 109 from being falsified or to prevent the falsification or illegal use thereof if there is a fear that it will be illegally used. For example, it is possible to immediately cope with a situation such that a decrypting method of the encryption of the listening right data 109 is opened on the Internet. According to the format shown in FIG. 10B, since the encrypting software and/or the EDC software can be further modified, the security for the listening right data can be made powerful.

As mentioned above, after the security for the listening right data 109 is changed, the listening right data 109 of the old security becomes invalid, so that the contents cannot be used in the old listening right data 109, that is, the contents cannot be reproduced by the decoding of the contents data. In this case, the person who possesses the old listening right data 109 which cannot be used can request the settlement center 110 to exchange the old listening right data 109 to new listening right data 109. In place of the exchanging system for changing the foregoing start year/month/day (YMD) or the like at a point when the falsification is found out or in addition to the exchanging system as mentioned above, it is also possible to use a system such that when the user has fully used the listening right data by the reproduction of the contents or newly obtains listening right data because a remaining amount becomes small, the remaining old listening right data is automatically exchanged to the new listening right data.

FIG. 11 is a flowchart showing processes in which the reproduction of the contents and the security for the listening right data 109 are associated with each other. For example, a case where the security for the listening right data 109 is periodically changed once a year will be described. In step S1, when the user intends to reproduce the encrypted contents, whether a validity term of the listening right data 109 lies within one year or not is discriminated in step S2. The secure decoder 202 has a calendar therein and can make the discrimination in step S2 on the basis of the start year/month/day (YMD) of the listening right data shown in FIG. 10A. In this case, for example, it is also possible to discriminate in step S2 in a manner such that a known period α of a certain extent is added to one year and when the time elapses the period (one year+α), the listening right data is invalidated.

If it is determined in step S2 that the use term of the listening right data has expired one year or more, the reproduction of the contents is stopped (step S3). If it is determined in step S2 that the listening right data is the data within one year, whether an amount of the listening right data is equal to or larger than minimum units (a) which are necessary for reproducing the contents, that is, for decoding the contents data or not is discriminated in step S4. If the listening right data of the minimum units does not remain in step S4, the reproducing process is stopped and a message indicative of such a fact is displayed on the display 23 of the player 201 (step S5). It is also possible to generate a vocal message to thereby inform the user of such a fact in place of displaying the message. Also in step S3, the message can be also similarly shown to the user in a manner similar to step S5.

If it is determined in step S4 that the listening right data of an amount which is equal to or larger than the minimum units a which are necessary for reproduction of the contents remains, one unit of the listening right data is consumed. Whether the listening right data has actually been consumed or not is monitored in step S6. For example, a state before the listening right data is consumed and a state after it was consumed are compared. For instance, whether the degree set as listening right data has correctly been subtracted by a predetermined value such as "1" or the like on the basis of the charge conditions of the reproduction charge or not is discriminated. When the listening right data is not consumed due to the illegal falsification or the like, step S5 follows and the processing routine advances to the reproduction stop of the contents and the presentation of the message to the user. If the consumption of the listening right data can be confirmed in step S6, the encryption performed to the contents data is decoded and the contents is reproduced as mentioned above in step S7. Together with the stop of the reproduction of the contents or the presentation of the message such as a warning or the like to the user which is executed in step S3 or S5, or in place of those processes in steps S3 and S5, it is also possible to notify the settlement center 110 of a fact that the result of the security check about the listening right data indicates NG from the secure decoder 202 or player 201.

Whether the reproduction of the contents has been finished or not is discriminated in step S8. The reproduction of the contents is finished ordinarily by a method whereby the user instructs the stop by the key operation of the operation unit 22 of the player 201 for playback. So long as the reproduction of the contents continues, the processes in steps S4 to S8 are repeated. For example, the listening right data is consumed, for example, the degree is subtracted as mentioned above in accordance with the time during which the user is reproducing the contents. If it is determined in step S8 that the reproduction of the contents has been finished, the reproducing process is finished (step S9). Although the example of FIG. 11 relates to the charging process in which the listening right data decreases in accordance with the unit time of the reproducing time, the invention can be also similarly applied to the case where the degree is added in accordance with the reproducing time as mentioned above.

It is also possible to use a method whereby contents to be used or reproduced, for example, music piece data has the year/month/day data in the subordinate data, the year/month/day data is mutually collated between the music piece data and the listening right data by the counter 403 or the like, and whether the contents to be used or reproduced is the contents which can be reproduced or not is discriminated in accordance with the year/month/day of the listening right data.

Further, it is also possible to use a method whereby when the falsification or the like of the listening right data is found out, the old listening right data is replaced with the new one by an instruction from the settlement center instead of rewriting the listening right data. For example, in case of the data charger in which 10000 degrees (points) can be inputted and when the remaining degree is equal to 3000 degrees and it is desired that 5000 degrees is restored, (3000+5000) degrees including the remaining degree can be also set to new listening right data. Furthermore, in a system such that the reproduction log is transmitted from the player to the data charger, it is possible to construct the system in a manner such that if the data is illegally listened and the reproduction logs exceed a predetermined permission amount, the listening right data is invalidated or the like, and the reproduction of the contents by the player is inhibited. If such a situation occurs, it is automatically reported from the data charger to the settlement center. Upon reporting, the data charger can also collect all of the listening right data remaining in the player. Moreover, in a system such that the reproduction logs are collected in the settlement center, it is also possible to use a method whereby a history in which the electronic money and electronic use right were transmitted to the user is compared with a use history of the reproduction logs collected from the user side, thereby detecting whether the user has illegally used or not.

Although the above embodiment has been described with respect to the audio contents as contents which are mainly reproduced, in a manner similar to that mentioned above, the invention can be also applied to contents such as video data, still image data, character data, computer graphics data, game software, computer program, etc. other than the audio data.

As will be obviously understood from the above description, according to the invention, since the security is changed, the security of the electronic money or electronic use right can be improved. For example, even if the falsified electronic money or electronic use right is circulated or the illegal using method is opened, it is possible to immediately cope with it. By periodically changing the security, a fear of illegal use or falsification can be prevented. Further, when the result of the security check indicates NG, by inhibiting the use of the contents, not only the electronic money or electronic use right but also the copyright of the contents can be powerfully protected. Moreover, in the system of collecting the reproduction logs, the illegality can be found out from the transferred electronic money or electronic use right and the reproduction logs.

The invention claimed is:

1. A reproducing method of contents data, comprising the steps of:
    checking a security for an electronic use right when compressed and/or encrypted contents data is to be reproduced;
    preventing reproduction of said contents data when said electronic use right is invalid as a result of the checked security; and
    reproducing said contents data and consuming said electronic use right when said electronic use right is valid as a result of the checked security;
    wherein said electronic use right includes a header, a valid start date, an encryption type, listening rights data, an error correction code, and a software for decoding encryption; the electronic use right is consumed by subtracting an amount from the listening rights data based on a charge condition found in subordinate data associated with said contents data.

2. The reproducing method of contents data according to claim 1, wherein, when said electronic use right is valid as a result of the checked security, determining whether there is sufficient listening rights data for reproducing said contents data.

3. The reproducing method of contents data according to claim 1, wherein said electronic use right further includes an encryption software.

4. The reproducing method of contents data according to claim 1, wherein when said electronic use right is invalid as a result of the checked security, a management organization for managing said electronic use right is notified.

5. The reproducing method of contents data according to claim 1, further comprising a step of restoring said electronic use right by replacement with a new electronic use right and transmitting a reproduction history of the reproduced contents data to a management organization for managing said electronic use right.

6. A reproducing method of contents data, comprising the steps of:
    checking a security for an electronic use right that is used in a charging process that is executed when compressed and/or encrypted contents data is to be reproduced;
    preventing reproduction of said contents data when said electronic use right is invalid as a result of the checked security; and
    reproducing said contents data and performing the charging process based on said electronic use right, when said electronic use right is valid as a result of the checked security;
    wherein said electronic use right includes a header, a valid start date, an encryption type, listening rights data, an error correction code, and a software for decoding encryption; the charging process is performed by subtracting an amount from the listening rights data based on a charge condition found in subordinate data associated with said contents data.

7. The reproducing method of contents data according to claim 6, wherein, when said electronic use right is valid as a result of the checked security, determining whether there is sufficient listening rights data for reproducing said contents.

8. The reproducing method of contents data according to claim 6, wherein when said electronic use right is invalid, a management organization for managing said electronic use right is notified.

9. The reproducing method of contents data according to claim 6, further comprising a step of restoring said electronic use right by replacement with a new electronic use right.

10. A reproduction control method comprising the steps of:
    storing an electronic use right purchased from a management organization into a memory in a player;
    checking a security for said electronic use right that is used in a charging process which is executed when compressed and/or encrypted contents data is to be reproduced by the player;
    preventing reproduction of said contents data when said electronic use right is invalid as a result of the checked security; and
    reproducing said contents data and executing the charging process based on said electronic use right, when said electronic use right is valid as a result of the checked security;
    wherein said electronic use right includes a header, a valid start date, an encryption type, listening rights data, an error correction code, and an encryption software; the charging process is performed by subtracting an amount from the listening rights data based on a charge condition found in subordinate data associated with said contents data.

11. The reproduction control method according to claim 10, further comprising a step of restoring said electronic use right by replacement with a new electronic use right.

12. The reproduction control method according to claim 10, further comprising a step of restoring said electronic use right by replacement with a new electronic use right and transmitting a reproduction history of the reproduced contents data to said management organization for managing said electronic use right.

13. The reproduction control method according to claim 12, wherein when said reproduction history exceeds a predetermined permission amount, said management organization inhibits reproduction of the contents data by said player.

* * * * *

UNITED STATES PATENT AND TRADEMARK OFFICE
CERTIFICATE OF CORRECTION

PATENT NO.        : 7,346,582 B2                                             Page 1 of 1
APPLICATION NO. : 09/913946
DATED             : March 18, 2008
INVENTOR(S)       : Yoichiro Sako et al.

It is certified that error appears in the above-identified patent and that said Letters Patent is hereby corrected as shown below:

Title Page, (75) line 3, "Kangawa" should read --Kanagawa--;

Column 2, line 3, delete "of";

Column 2, line 4, delete "claim 1,";

Column 2, line 8, delete "of cliam6,";

Column 2, line 13, delete "of claim 12,";

Column 8, line 17, "mails-a" should read --mails a--;

Column 10, line 16, delete "To";

Column 13, line 1, "medium 17" should read --medium 1,--;

Column 22, line 12, "tents." should read --tents data.--.

Signed and Sealed this

Twenty-first Day of April, 2009

JOHN DOLL
*Acting Director of the United States Patent and Trademark Office*